(12) United States Patent
Beard et al.

(10) Patent No.: US 8,128,819 B2
(45) Date of Patent: Mar. 6, 2012

(54) FLUID FILTER, FLUID FILTER ASSEMBLY, AND MOUNTING METHOD

(75) Inventors: John H. Beard, Kearney, NE (US); Farrell F. Calcaterra, Kearney, NE (US)

(73) Assignee: Baldwin Filters Inc., Kearney, NE (US)

( * ) Notice: Subject to any disclaimer, the term of this patent is extended or adjusted under 35 U.S.C. 154(b) by 833 days.

(21) Appl. No.: 12/139,638

(22) Filed: Jun. 16, 2008

(65) Prior Publication Data
US 2009/0308801 A1    Dec. 17, 2009

(51) Int. Cl.
*B01D 35/153* (2006.01)
*B01D 27/10* (2006.01)

(52) U.S. Cl. ......... 210/235; 210/232; 210/234; 210/429

(58) Field of Classification Search .......... 210/232, 210/234, 235, 443, 444, 429
See application file for complete search history.

(56) References Cited

U.S. PATENT DOCUMENTS

| | | |
|---|---|---|
| 1,761,924 A | 6/1930 | Kamrath |
| 3,361,260 A | 1/1968 | Buckman |
| 3,370,708 A | 2/1968 | Hultgren et al. |
| 3,384,241 A | 5/1968 | Nostrand |
| 3,420,377 A | 1/1969 | Vandersip |
| 3,988,244 A | 10/1976 | Brooks |
| 4,372,847 A | 2/1983 | Lewis |
| 4,812,235 A | 3/1989 | Seleman et al. |
| 4,915,831 A | 4/1990 | Taylor |
| 5,078,877 A | 1/1992 | Cudaback et al. |
| 5,102,541 A | 4/1992 | Breitbach |
| 5,203,994 A | 4/1993 | Janik |
| 5,259,953 A | 11/1993 | Baracchi et al. |
| 5,302,284 A | 4/1994 | Zeiner et al. |
| 5,342,511 A | 8/1994 | Brown et al. |
| 5,350,506 A | 9/1994 | Dombek et al. |
| 5,362,390 A | 11/1994 | Widenhoefer et al. |
| 5,364,528 A | 11/1994 | Schwarz et al. |
| 5,390,701 A | 2/1995 | Lessley et al. |
| 5,486,288 A | 1/1996 | Stanford et al. |
| 5,560,824 A * | 10/1996 | Sann et al. ............ 210/234 |
| 5,674,393 A | 10/1997 | Terhune et al. |

(Continued)

FOREIGN PATENT DOCUMENTS

DE    199 60 600 A1    6/2001

(Continued)

OTHER PUBLICATIONS

Dahl Baldwin, Marine Diesel Fuel/Water Separators, Installation pamphlet, 2005, 9 pages, pp. 1-9.

*Primary Examiner* — Tony G Soohoo
*Assistant Examiner* — Peter Keyworth
(74) *Attorney, Agent, or Firm* — Reinhart Boerner Van Deuren P.C.

(57) ABSTRACT

A filter and filter element is provided that incorporates a valve member for preventing priming fluid from contaminating a clean fluid side of the filter or filter element. The filter may incorporate a replaceable filter element or be replaceable itself. The valve member is preferably formed as an annular flange of a grommet mounted to an end cap of the filter element. The annular flange sealingly engages with the end cap and closes a clean fluid outlet port in a relaxed state and opens the clean fluid outlet port in a deformed state.

2 Claims, 4 Drawing Sheets

U.S. PATENT DOCUMENTS

| | | | |
|---|---|---|---|
| 5,698,093 | A | 12/1997 | Pyle et al. |
| 5,744,030 | A | 4/1998 | Reid et al. |
| 5,788,859 | A * | 8/1998 | Biere .................... 210/312 |
| 5,817,234 | A | 10/1998 | Dye et al. |
| 5,837,137 | A | 11/1998 | Janik |
| 5,868,932 | A | 2/1999 | Guichaoua et al. |
| 5,906,737 | A | 5/1999 | Hoeppner |
| 5,938,921 | A | 8/1999 | Janik et al. |
| 5,985,142 | A | 11/1999 | Belden |
| 6,048,455 | A | 4/2000 | Janik |
| 6,068,763 | A | 5/2000 | Goddard |
| 6,171,491 | B1 | 1/2001 | Popoff et al. |
| 6,187,188 | B1 | 2/2001 | Janik et al. |
| 6,189,513 | B1 * | 2/2001 | Brown et al. .................. 123/497 |
| 6,193,884 | B1 | 2/2001 | Magnusson et al. |
| 6,207,052 | B1 * | 3/2001 | Webb .................. 210/321.75 |
| 6,387,259 | B1 | 5/2002 | Roll |
| 6,471,070 | B2 * | 10/2002 | Janik ........................ 210/438 |
| 6,485,635 | B1 | 11/2002 | Gandini et al. |
| 6,488,845 | B1 | 12/2002 | Neufeld et al. |
| 6,495,042 | B1 | 12/2002 | Knight |
| 6,500,335 | B2 | 12/2002 | Janik et al. |
| 6,506,302 | B2 | 1/2003 | Janik |
| 6,517,717 | B1 | 2/2003 | Håkansson |
| D472,299 | S | 3/2003 | Fritze |
| D472,604 | S | 4/2003 | Fritze |
| 6,565,746 | B1 | 5/2003 | Stamey, Jr. et al. |
| 6,615,990 | B1 | 9/2003 | Jokschas et al. |
| 6,652,740 | B2 | 11/2003 | Schoess |
| 6,662,954 | B2 | 12/2003 | Gottwald-Grill et al. |
| 6,673,250 | B2 | 1/2004 | Kuennen et al. |
| 6,723,239 | B2 | 4/2004 | Maxwell |
| 6,740,234 | B1 | 5/2004 | Williams et al. |
| 6,863,811 | B2 | 3/2005 | Janik |
| 6,881,334 | B2 | 4/2005 | Janik |
| 6,896,803 | B2 | 5/2005 | Cline et al. |
| 6,926,827 | B2 * | 8/2005 | Gruca et al. .................. 210/234 |
| 6,977,006 | B2 | 12/2005 | Reid |
| 7,042,346 | B2 | 5/2006 | Paulsen |
| 7,048,488 | B1 | 5/2006 | Kuznetsov et al. |
| 7,070,692 | B2 | 7/2006 | Knight |
| 7,081,201 | B2 | 7/2006 | Bassett et al. |
| 2002/0166805 | A1 | 11/2002 | Minns et al. |
| 2002/0185454 | A1 | 12/2002 | Beard et al. |
| 2004/0144713 | A1 | 7/2004 | Bassett et al. |
| 2005/0056582 | A1 | 3/2005 | Patel et al. |
| 2005/0103692 | A1 * | 5/2005 | Stanhope et al. .............. 210/130 |
| 2005/0161378 | A1 | 7/2005 | Cline |
| 2005/0161386 | A1 | 7/2005 | Gustafson et al. |
| 2005/0194317 | A1 | 9/2005 | Ikeyama et al. |
| 2006/0016745 | A1 | 1/2006 | Nguyen et al. |
| 2006/0016769 | A1 | 1/2006 | Hacker et al. |
| 2006/0054547 | A1 | 3/2006 | Richmond et al. |
| 2006/0060512 | A1 | 3/2006 | Astle et al. |
| 2006/0096934 | A1 | 5/2006 | Weinberger et al. |
| 2006/0118475 | A1 | 6/2006 | Girondi |
| 2006/0124516 | A1 | 6/2006 | Merritt et al. |
| 2006/0151371 | A1 | 7/2006 | Weinberger et al. |
| 2006/0180539 | A1 | 8/2006 | Wolf et al. |
| 2006/0186031 | A1 | 8/2006 | Fick et al. |
| 2006/0191836 | A1 | 8/2006 | Dworatzek et al. |
| 2006/0219621 | A1 | 10/2006 | Dworatzek |
| 2006/0219626 | A1 | 10/2006 | Dworatzek et al. |
| 2007/0215561 | A1 | 9/2007 | Yates et al. |
| 2009/0301949 | A1 * | 12/2009 | Kolczyk et al. ............... 210/130 |

FOREIGN PATENT DOCUMENTS

| | | |
|---|---|---|
| EP | 0 880 987 A1 | 12/1998 |
| JP | 9173717 | 7/1997 |
| WO | WO 2007/053228 A2 | 5/2007 |

* cited by examiner

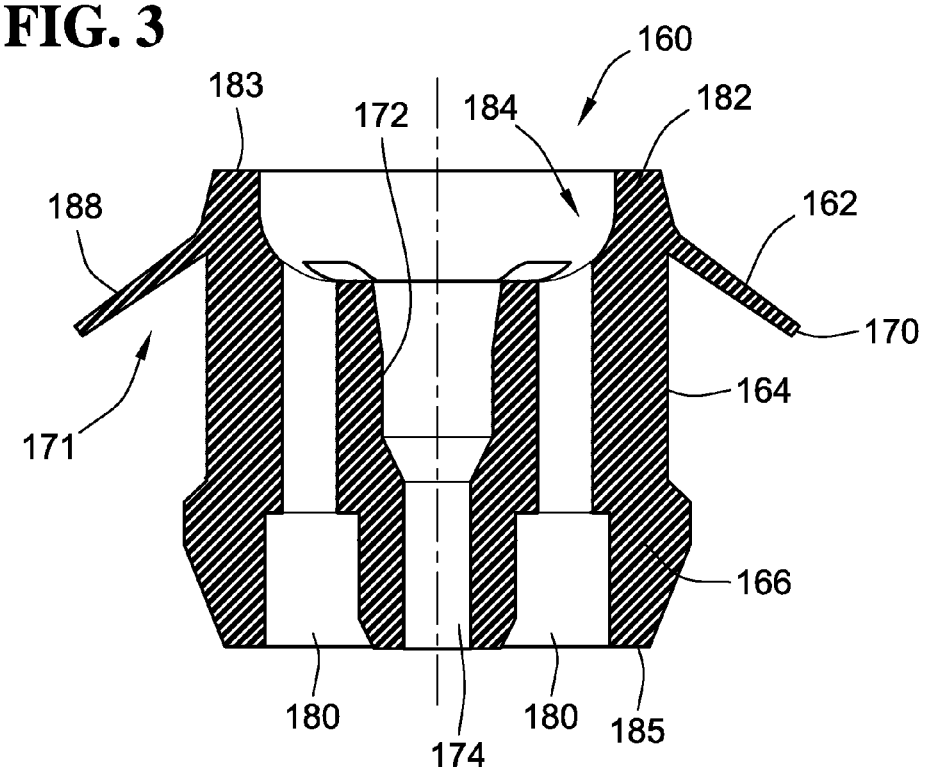
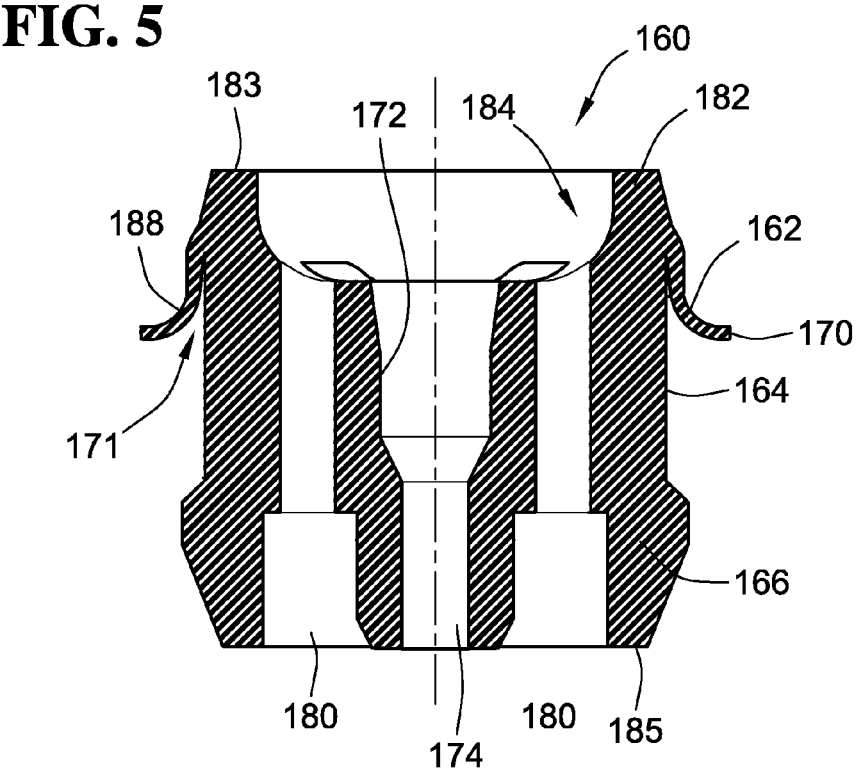

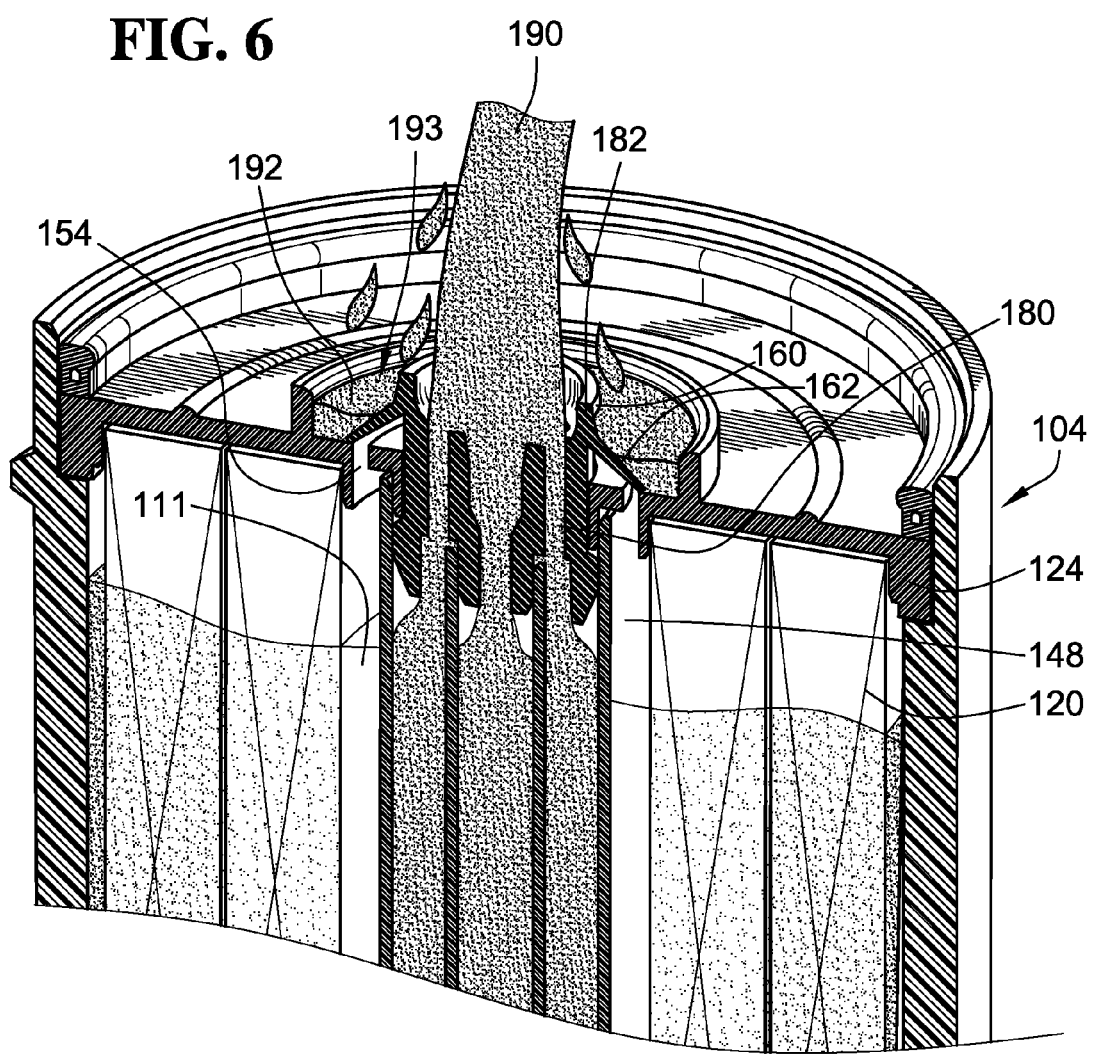

FLUID FILTER, FLUID FILTER ASSEMBLY, AND MOUNTING METHOD

FIELD OF THE INVENTION

This invention generally relates to liquid filtration and more particularly to filter assemblies for liquid filtration and filters for use therewith and methods of mounting filters to filter bases.

BACKGROUND OF THE INVENTION

Filters are used in filtration systems to filter impurities from fluid such as fuels or lubricants, prior to the fluid being used in a downstream system such as an engine or a transmission. The use of replaceable filters allows the user to replace a relatively inexpensive or easily removable wear part when the filter media, which collects and removes the impurities from the fluid, becomes spent, rather than requiring replacement of the entire filtration system.

In some instances, it may be desirable to pre-fill or "prime" the filter with the same fluid that is being filtered to prevent significant pockets of air within the fluid filtration system to prevent mis-operation or malfunctioning of the downstream system to which the fluid is being supplied. The fluid used to prime the filter may also be referred to as "priming fluid."

Priming is typically performed by pouring some fluid into the filter through a dirty fluid inlet of the filter. During priming, it is beneficial to avoid allowing any of the priming fluid from getting downstream of the filter media, i.e. on a clean fluid side of the filter media. Thus, the priming fluid is filtered prior to being transported to and used by the downstream system. This prevents any contaminants or impurities that may be in the priming fluid from bypassing the filter media and ultimately entering the downstream system.

However, many filters include a dirty fluid inlet proximate a clean fluid outlet such that attempts to prime the filter through the dirty fluid inlet ultimately result in priming fluid entering the clean fluid outlet (i.e. downstream of the filter media and thus on the clean side). Thus, these impurities are undesirably permitted to ultimately travel to the downstream system that uses the fluid.

The present invention relates to improvements in filters and filter assemblies that prevent dirty or priming fluid from bypassing the filter media by entering the wrong fluid flow ports while priming a new filter and, particularly, a replacement filter.

BRIEF SUMMARY OF THE INVENTION

The present invention has several aspects or embodiments that may be claimed and stand as patentable independently and individually or in combination with other aspects, including but not limited to the following.

In one aspect, the invention provides a valve member that prevents priming fluid from contaminating a clean fluid side of a filter during priming of the filter, prior to mounting the filter to a filter base.

In implementing this valve member feature, one embodiment of a filter element includes a tubular ring of filter media, an end cap and a valve member. The end cap has an inner face sealingly secured to an end of the tubular ring of filter media. The end also has an outer face facing away from the tubular ring of filter media. The end cap further includes a fluid flow port passing through the end cap fluidly communicating the inner face with the outer face. The valve member extends across the fluid flow port and sealingly closes the fluid flow port by sealingly interacting with one of the faces of the end cap in a relaxed condition. The valve member opens the flow port in a deformed condition. The deformed condition being a different condition than the relaxed condition In another aspect, an embodiment of the invention provides a filter assembly that includes a filter base and a filter removably mounted to the filter base. The filter base comprises clean and dirty fluid ports and a valve actuator. The filter comprises a cover, a tubular ring of filter media and a valve member. The cover defines a dirty fluid inlet and a clean fluid outlet. The dirty fluid inlet is in fluid communication with the dirty fluid port and the clean fluid outlet is in fluid communication with the clean fluid port when the filter is mounted to the filter base. The tubular ring of filter media is coupled to the cover and is interposed between the dirty fluid inlet and clean fluid outlet. The valve member is coupled to the cover. The valve member has a relaxed condition, when the filter is removed from the filter base, in which the valve member closes the clean fluid outlet by extending across the clean fluid outlet. The valve member has a deformed condition, when the filter is mounted to the filter base, in which the valve member opens the clean fluid outlet. The valve actuator deforms the valve member into the deformed condition when the filter is mounted to the filter base.

In yet another aspect, an embodiment of the invention provides a grommet that includes a valve member. More particularly, the grommet includes an annular support body having coaxial inner and outer surfaces. A deformable annular flange is coaxial with the inner and outer surfaces and extends radially from the outer surface. The annular flange and support body define an annular channel therebetween. The annular flange is deformable radially toward the outer surface. At least one inlet is formed in the annular body radially between the inner and outer surfaces.

In yet a further aspect, an embodiment of the invention provides a method of mounting a filter to a filter base. The method includes the step of priming the filter and the step of mounting the filter to the filter base. The step of priming the filter includes the steps of pouring priming fluid into a dirty fluid port of the filter element; and preventing the priming fluid from passing through a clean fluid port of the filter element, simultaneously with the step of pouring priming fluid. The step of mounting the filter to the filter base includes the steps of connecting the filter to the filter base; and opening the clean fluid passage simultaneously with the step of connecting the filter to the filter base.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a cross-sectional illustration of a grommet of the filter of FIG. 2, the grommet being in a relaxed condition.

FIG. 5 is a cross-sectional illustration of a grommet of the filter of FIG. 4, the grommet being in a deformed condition; and FIG. 6 is a cross-sectional illustration illustrating priming of the filter of the filter assembly of FIG. 1.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
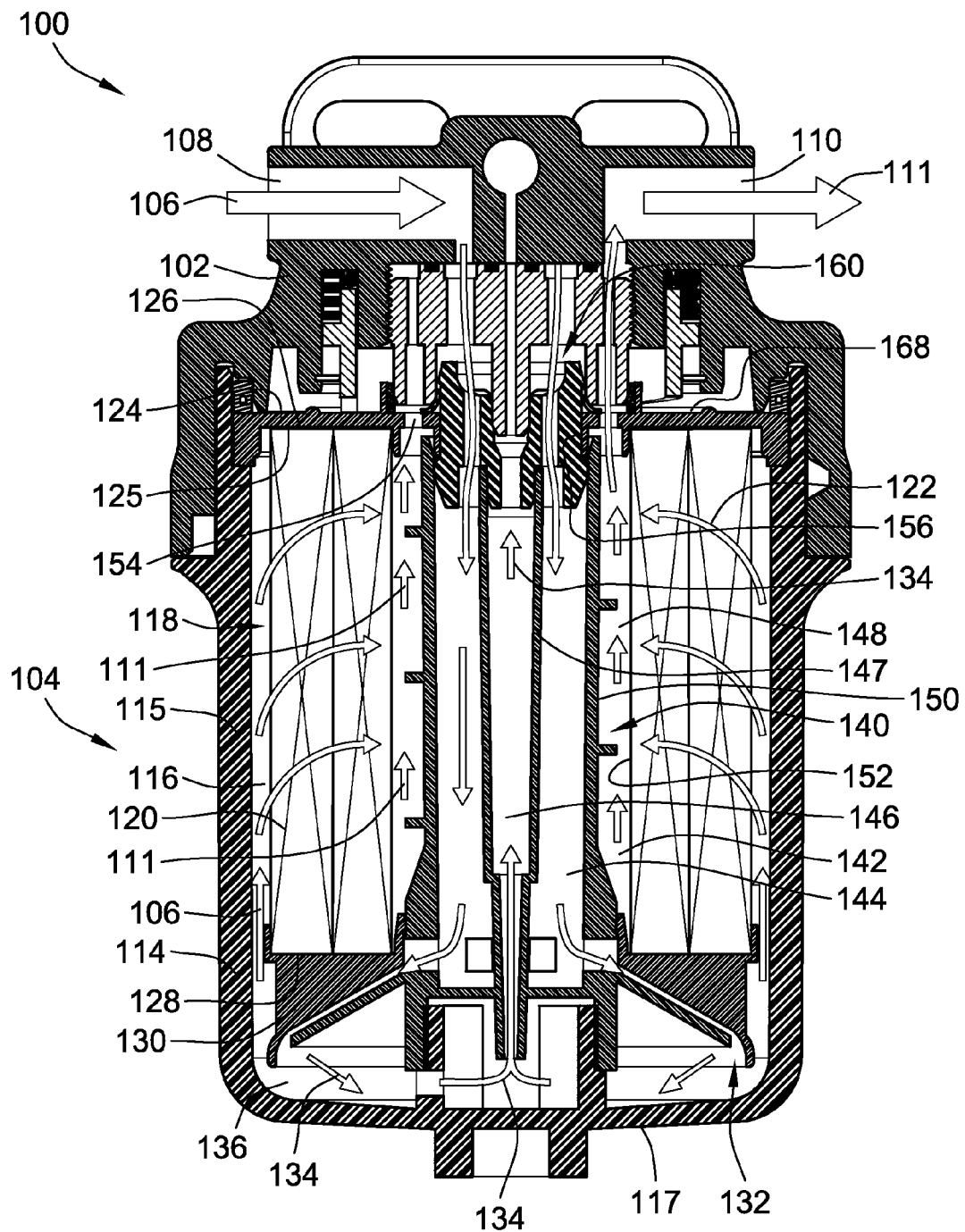
FIG. 1 is a cross-sectional illustration of a filter assembly in accordance with the teachings of the present invention.

FIG. 1 illustrates an embodiment of a filter assembly 100 according to the teachings of the present invention. The filter assembly 100 generally includes a filter base 102 and a filter 104. The filter 104 connects to the filter base 102 and acts to filter impurities from dirty fluid 106 passing through the filter assembly 100.

Dirty fluid 106 enters the filter assembly 100 through dirty fluid inlet port 108 of the filter base 102 from a system such as an engine or from a fluid storage tank such as fuel tank (neither shown). After entering the filter base 102, the dirty fluid passes through the filter 104 and is cleaned. The clean fluid (illustrated as arrows 111) then exits the filter assembly 100 through clean fluid port 110 of the filter base 102.

The filter 104 of FIG. 1 includes an outer housing 114 having an annular side wall 115 and a bottom end all 117 that defines an internal cavity 116 that houses a replaceable filter element 118. The filter element 118 includes a tubular ring of filter media 120 which separates impurities from the dirty fluid 106 as it passes therethrough, as illustrated by arrows 122.

A cover, in the form of a top end cap 124 is sealingly connects to an open end of the housing 114. The top end cap 124 further sealingly connects to a top end 126 of the tubular ring of filter media 120. The illustrated filter media 120 is a combination of a pair of concentric rings of filter media. However, more or less filter media rings may be used. The sealing connection is generally formed between an inner face 125 of the top end cap 124 and the top end 126 of the ring of filter media 120 to prevent fluid bypass therebetween. By preventing fluid bypass, the dirty fluid 106 is forced to pass through the filter media 120 and avoids dirty fluid 106 from circumventing the filter media.

The sealing connection between the top end cap 124 and ring of filter media 120 may be provided by any known connection. By way of example, the top end cap 124 may be potted to the ring of filter media 120, the ring of filter media 120 may be ultrasonically bonded to the top end cap 124, the ring of filter media 120 may be embedded into the top end cap 124 or any other means of providing a sealing connection may be implemented.

The bottom end 128 of the ring of filter media 120 is sealingly connected to a bottom end cap 130. The bottom end 128 and bottom end cap 130 may be sealingly connected in a similar or different manner as the top end cap 124 and top end 126.

The bottom end cap 130 of the present invention includes a water separating device, illustrate in the form of a cone separator 132, to separate water from the dirty fluid 106 prior to the dirty fluid 106 passing through the filter media 120. The separated water, illustrated as arrows 134, can then be held in a reservoir 136 between the bottom end cap 130 and the end wall 117 of housing 114. The water 134 may ultimately be evacuated from the filter assembly 100 altogether. In one embodiment, the water is drawn back to a fuel tank due to a pressure differential between the fuel tank and the dirty fluid after it passes through a fuel pump (not shown).

The filter assembly 100 further includes a center tube 140 that is positioned within a central cavity 142 of the tubular ring of filter media 120. The center tube 140 defines outer and inner fluid flow passages 144, 146 which direct separated fluid flows of the dirty fluid 106 and separated water 134 between the top and bottom ends 126, 128 of the filter media 120.

The outer fluid flow passage 144 provides a flow path for dirty fluid 106 through the central cavity 142 of the filter media 120 to the cone separator 132, while the inner fluid flow passage 146 provides a flow path for the separated water 134 to be evacuated from the filter 104, and ultimately out of the filter base 102. The outer and inner flow passages 144, 146 are separated by an annular wall 147 of the center tube 140.

Additionally, a clean fluid cavity 148 is formed between an outer wall 150 of the center tube 140 and an inner side 152 (or clean side) of the ring of filter media 120. The outer wall 150 of the center tube 140 separates the outer fluid flow passage 144, through which dirty fluid 106 flows, from the clean fluid cavity 148 to prevent mixing of the dirty and clean fluids 106, 111.

The top end cap 124 further defines a clean fluid outlet 154, which fluidly communicates the clean fluid cavity 148 with the exterior of the filter 104, and ultimately with the clean fluid port 110 of the filter base 102. As illustrated, the clean fluid outlet 154 is in the form of a plurality of apertures that pass axially through the top end cap 124.

The filter 104 further includes a deformable grommet 160 sealingly mounted in a further aperture formed axially through the top end cap 124. The aperture is defined by inner wall 156. The top end cap 124 is preferably formed of plastic or a metal material. The grommet 160 is preferably formed of a flexible rubber or rubber-like material that has good sealing characteristics with metals or plastics. In the illustrated embodiment, the grommet 160 and top end cap 124 are formed of different materials.

The grommet 160, in the illustrated embodiment, performs several functions.

The grommet 160 provides a valve member that prevents impurities from entering the clean fluid outlet 154 of the filter 104 when the filter 104 is removed from the filter base 102, particularly while priming the filter 104. However, as the grommet 160 acts as a valve member, it can be deformed to allow clean fluid 111 to exit the filter 104 when mounted to the filter base 102.

Also, the grommet 160 interfaces the outer and inner fluid flow paths 144, 146 of the center tube 140 with corresponding flow passages of the filter base 102 to permit dirty fluid 106 to enter the filter 104 and separated water 134 to be removed from the filter 104. Further, the grommet 160 separates the dirty fluid flow 106 from the clean fluid flow 111 as the fluid flows 106, 111 pass between the filter base 102 and filter 104. Other embodiments of the invention may have a grommet that performs more or less of these functions.

Figure 2:
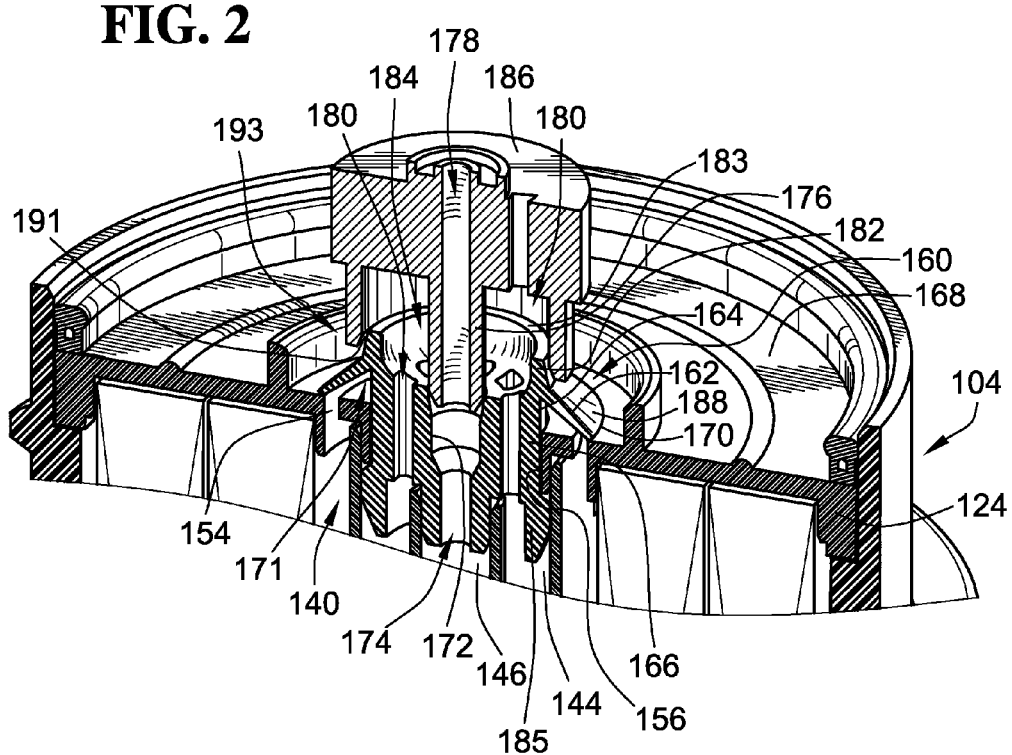
FIG. 2 is a partial cross-sectional illustration of the filter of the filter assembly of FIG. 1 removed from the filter base of the filter assembly such that a valve member of the filter is in a closed condition.

As illustrated in FIG. 2, the filter 104 is removed from the filter base 102 and the grommet 160 is illustrated in a relaxed position. As used herein, "relaxed position", "relaxed condition" or "relaxed state" are synonymous and all refer to a same condition. The grommet 160 includes a valve member in the form of annular flange 162, which in a relaxed position closes clean fluid outlet 154.

With additional reference to FIG. 3 illustrating the grommet 160 removed from the rest of the filter 104 and filter element 118, the annular flange 162 extends from an outer surface 164 of a support wall 166 of the grommet 160. In the relaxed state, the annular flange 162 extends radially outward from the outer surface 164 and axially toward and into sealing engagement with an outer face 168 of the top end cap 124. More particularly, a distal end 170 of the annular flange 162 axially abuts the outer face 168 of the top end cap 124.

The annular flange 162 has a tapering cross-section having a wider base portion proximate its attachment to the support wall 166 relative to the thickness proximate distal end 170. However, other embodiments can have an annular flange that has a generally constant cross-sectional thickness.

The annular flange 162 and the outer surface 164 of the support wall 166 form a relief gap 171 therebetween. The relief gap 171 facilitates deformation of the annular flange 162 from the relaxed condition to a deformed condition (see FIGS. 4 and 5) to open the clean fluid outlet 154. As used herein, "deformed condition", "deformed state" and "deformed position" are synonymous and all refer to the same condition.

The support wall 166 further includes an inner annular surface 172 defining a central flow path 174. This central flow path 174 fluidly communicates with the inner flow path 146 of the center tube 140. The center flow path 174 also receives a cylindrical stub post 176 and fluidly communicates the central passage 178 of the cylindrical stub post 176 with the inner flow path 146 of the center tube 140.

As the grommet 160 is preferably formed of rubber or a similar material, the grommet 160 can flex or deform to receive the stub post 176 as the filter 104 is mounted to the filter base 102 (such as illustrated in FIGS. 1 and 2) and maintain a good seal therebetween, even if the stub post 176 does not perfectly align with the central flow path 174 of the grommet 160. As such, fluid can be transferred from the filter 104, and particularly inner flow passage 146 to the filter base 102 without contaminating other fluid flows between the filter 104 and the filter base 102, such as dirty fluid or clean fluid flows 106, 111.

The grommet 160 further includes a dirty fluid flow path, illustrated in the form of a plurality of fluid channels 180, extending axially through the support wall 166. The fluid channels 180 are formed radially between the inner and outer surfaces 164, 172 of the support wall 166. When the grommet 160 is mounted to the filter 104, the fluid flow channels 180 provide an interface between the outer flow passage 144 of the center tube 140, through which dirty fluid 106 travels within the filter 104, and the dirty fluid port 108 of the filter base 102.

The outer surface 164 of the grommet engages an inner surface of outer wall 150. The grommet 160 further engages an outer surface of inner wall 147. An axial end of the inner wall 147 is axially received in an annular slot formed in end 185 (see FIG. 3 for reference to identification of end 185).

The support wall 166 includes an extension portion 182 forming an annular hub or annular boss that forms an axial end 183 of the grommet 160. The portion of the outer surface 164 of the support wall 166 proximate the extension portion 182 tapers radially and provides a cam surface upon which a valve actuator 186 of the filter base 102 rides as the filter 104 is mounted to the filter base 102. The base of the annular flange 162 connects to the support wall 166 axially between the extension portion 182 and an opposite end 185 of the grommet 160.

The support wall 166 includes a stepped region 184, transitioning radially inward from a base portion of the extension portion 182. Openings for the central passage 178 and fluid channels 180 are formed in the stepped region 184.

Figure 4:
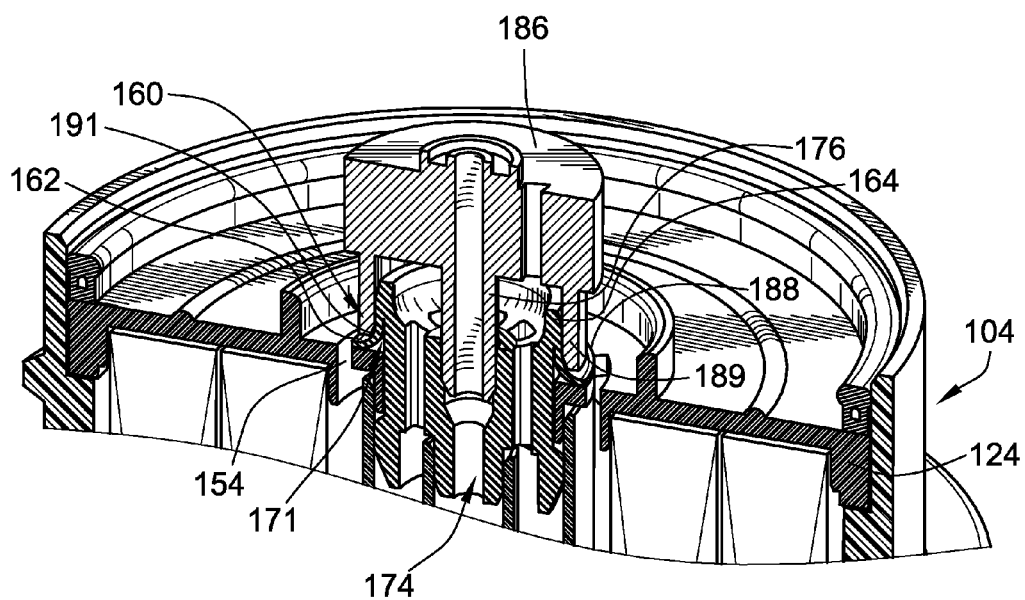
FIG. 4 is a partial cross-sectional illustration of the filter of the filter assembly of FIG. 1 attached to the filter base of the filter assembly such that a valve member of the filter is in an open condition.

FIG. 4 is a simplified illustration of the annular flange 162 engaged with a valve actuator 186 of the valve base 102. The valve actuator 186 engages the annular flange 162 deforming the annular flange 162 to open clean fluid outlet 154. More particularly, the valve actuator 186 presses axially against an outer surface 188 of the annular flange 162 in a direction directed toward the top end cap 124. The valve actuator 186 causes the annular flange 162 to bend and displace into the relief gap 171 formed between the annular flange 162 and the outer surface 164 of the support wall 166.

The bending of the annular flange 162 draws the annular flange 162, particularly distal end 170, radially inward toward the support wall 166 thereby exposing or opening the clean fluid outlet 154.

In the illustrated embodiment, the outer surface 188 of annular flange 162 is generally planar in the relaxed state. In the deformed state, the outer surface 188 is generally arcuate. The deformation of the annular flange 162 by the valve actuator 186 causes the radius of curvature of the annular flange 162 to decrease, i.e. from basically infinite to a finite number.

As illustrated, the valve actuator 186 includes an annular wall 189 that engages the outer surface 188 of the annular flange 162. When the filter 104 is mounted to the filter base 102, the annular wall 189 surrounds the axial extension portion 182 and sealingly engages the grommet 160. The annular wall 189 and grommet 160 separate the clean fluid 111 exiting the clean fluid outlet 154 from the dirty fluid 106 entering the flow channels 180 as the dirty fluid 106 enters the filter 104.

The annular wall 189 includes a tapered free end 191 that assists alignment of the grommet 160 with the valve actuator 186 during mounting of the filter 104 to the filter base 102. The tapered free end 191 acts like a corresponding cam surface that cooperates with the outer surface 164 of the grommet 160, particularly the portion proximate extension portion 182, during mounting of the filter 104 to the filter base 102.

With reference to FIG. 6, the annular flange 162 assists in preventing priming fluid 190 from entering the clean fluid port 154 while priming the filter 104 prior to attaching the filter 104 to the filter base 102. During priming, the extension portion 182 further acts as a funnel for pouring the priming fluid 190 into the filter 104. As the priming fluid 190 is poured into the extension portion 182, the annular flange 162 is in its relaxed state and extends over and covers clean fluid outlet 154 preventing any spilled priming fluid 192 from passing through the clean fluid outlet 154 and into clean fluid cavity 148.

In the illustrated embodiment, the top end cap 124 and the grommet 160 form a well 193 therebetween when the annular flange 162 is in a relaxed state. The spilled priming fluid 192 is stored in the well 193 until priming is complete. By sealingly engaging with the top end cap 124, the annular flange 162 prevents the spilled priming fluid 192 from passing through the clean fluid outlet 154 and contaminating the clean side of the ring of filter media 120 and particularly clean fluid cavity 148. Once priming is complete, the user can pour the spilled priming fluid 192 out of the well 193 or otherwise remove the fluid from the well 193, such as by using a rag or other adsorbent material.

It will be noted, that as the priming fluid 190 passes through outer and inner fluid flow passages 144, 146, the priming fluid 190 fills the filter 104. As the fluid 190 fills the filter 104, the priming fluid passes through filter media 120 and is cleaned such as illustrated as cleaned fluid 111.

With the spilled priming fluid 192 evacuated from the well 193, the filter 104 can then be attached to the filter base 102, such as illustrated in FIG. 1.

As the filter 104 is mounted to the filter base 102, the valve actuator 186 of the filter base 102 will deform the annular flange 162 to open the clean fluid outlet 154 fluidly communicating the clean fluid outlet 154 with the clean fluid port 110 of the filter base 102. As such, clean fluid that has passed through the filter media 120 can then pass through the filter base 102 and then onto the downstream system for use.

It should be noted that annular flange 162 prevents fluid from spilling out of clean fluid outlet 154 after the filter 104 is primed and while it is being mounted. Similarly, the annular flange 162 prevents fluid from exiting the clean fluid outlet 154 when the filter 104 is being removed after the filter element 118 is spent.

While the illustrated embodiment is contemplated to incorporate a re-useable housing 114 and a replaceable filter element 118, other embodiments may incorporate an entirely replaceable filter, such as where the entire housing 114 and filter element 118 are replaced. Additionally, while the present embodiment utilizes an annular flange 162 that extends radially outward from support wall 166, the annular flange could be configured such that it extends radially inward such that a support wall surrounds the annular flange. In such an embodiment, the annular flange would be deformed radially outward by a valve actuator of the filter base 102. Further, the grommet 160 need not include the plurality of ports. In other contemplated embodiments, the annular flange could be mounted to a support wall formed as part of the outer face of the end cap or cover.

As used herein, the term "filter" is to be read broad enough to encompass merely the filter element 118 which includes, by way of example only, the filter media 120, end caps 124, 130 and valve member (i.e. grommet 160). Alternatively, a "filter" may be the combination of the filter element 118 and the housing 114.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
a tubular ring of filter media;
an end cap having an inner face sealingly secured to an end of the tubular ring of filter media and an outer face facing away from the tubular ring of filter media, the end cap including a fluid flow port passing through the end cap fluidly communicating the inner face with the outer face;
a valve member extending across the fluid flow port and sealingly closing the fluid flow port by sealingly interacting with one of the faces of the end cap in a relaxed condition and opening the flow port in a deformed condition, the deformed condition being different than the relaxed condition;
wherein the valve member has a sealing contact portion in sealing engagement with the outer face of the end cap at a first position in the relaxed condition, and wherein the sealing contact portion is at a second position different than the first position in the deformed condition;
wherein the flow port has a circular outer peripheral edge and the valve member has a circular outer peripheral edge, the circular outer peripheral edge of the valve member extending radially beyond the circular outer peripheral edge of the flow port in the relaxed condition;
wherein the circular outer peripheral edge of the valve member is radially inward of the circular outer peripheral edge of the flow port and is seated against a top surface of the end cap in the deformed condition.

2. A filter assembly comprising:
a filter base comprising:
clean and dirty fluid ports; and
a valve actuator;
a filter removably mounted to the filter base comprising:
an end cap defining a dirty fluid inlet and a clean fluid outlet, the dirty fluid inlet in fluid communication with the dirty fluid port and the clean fluid outlet in fluid communication with the clean fluid port when the filter is mounted to the filter base;
a tubular ring of filter media coupled to the end cap; and
a valve member having a sealing contact portion, the valve member coupled to the end cap and having a relaxed condition, when the filter is removed from the filter base, in which the valve member closes the clean fluid outlet by extending across the clean fluid outlet such that the sealing contact portion is in sealing engagement with a surface of the end cap in a first position in the relaxed condition, and having a deformed condition, when the filter is mounted to the filter base, in which the valve member opens the clean fluid outlet such that the sealing contact portion of the valve member is in a second different position than the first position, the valve actuator deforming the valve member into the deformed condition when the filter is mounted to the filter base; and
wherein the valve member has a circular outer peripheral edge, wherein the circular outer peripheral edge extends radially beyond the clean fluid outlet in the relaxed condition, and radially inward of the clean fluid outlet in the deformed condition.

* * * * *